Aug. 8, 1939.  H. ZIEBOLZ ET AL  2,169,175
METHOD OF AND APPARATUS FOR CONTROLLING THE FLOW OF FLUIDS
Filed Oct. 7, 1936  2 Sheets-Sheet 2

Inventor
H. Ziebolz and
H. J. Velten

A. D. Adams
Attorney

Patented Aug. 8, 1939

2,169,175

UNITED STATES PATENT OFFICE

2,169,175

METHOD OF AND APPARATUS FOR CONTROLLING THE FLOW OF FLUIDS

Herbert Ziebolz and Hubert J. Velten, Chicago, Ill., assignors to Askania-Werke A. G., a company of Germany Application October 7, 1936, Serial No. 104,528

10 Claims. (Cl. 158—119)

This invention relates to an improved method of and apparatus for proportioning the relative flow and maintaining constant the sum of the flows of pressure fluids which are of different character and subject to variations in flow. More particularly, the invention relates to a method of and apparatus for supplying a mixing chamber or furnace with several different fluids or fuels, the relative amounts of which may be varied at will; while the total amount of heat produced by burning these fuels is maintained substantially constant.

This application involves specific improvements in the method and apparatus disclosed in the co-pending applications, Serial No. 104,526 and Serial No. 104,527, filed on even date herewith.

Figure 1:
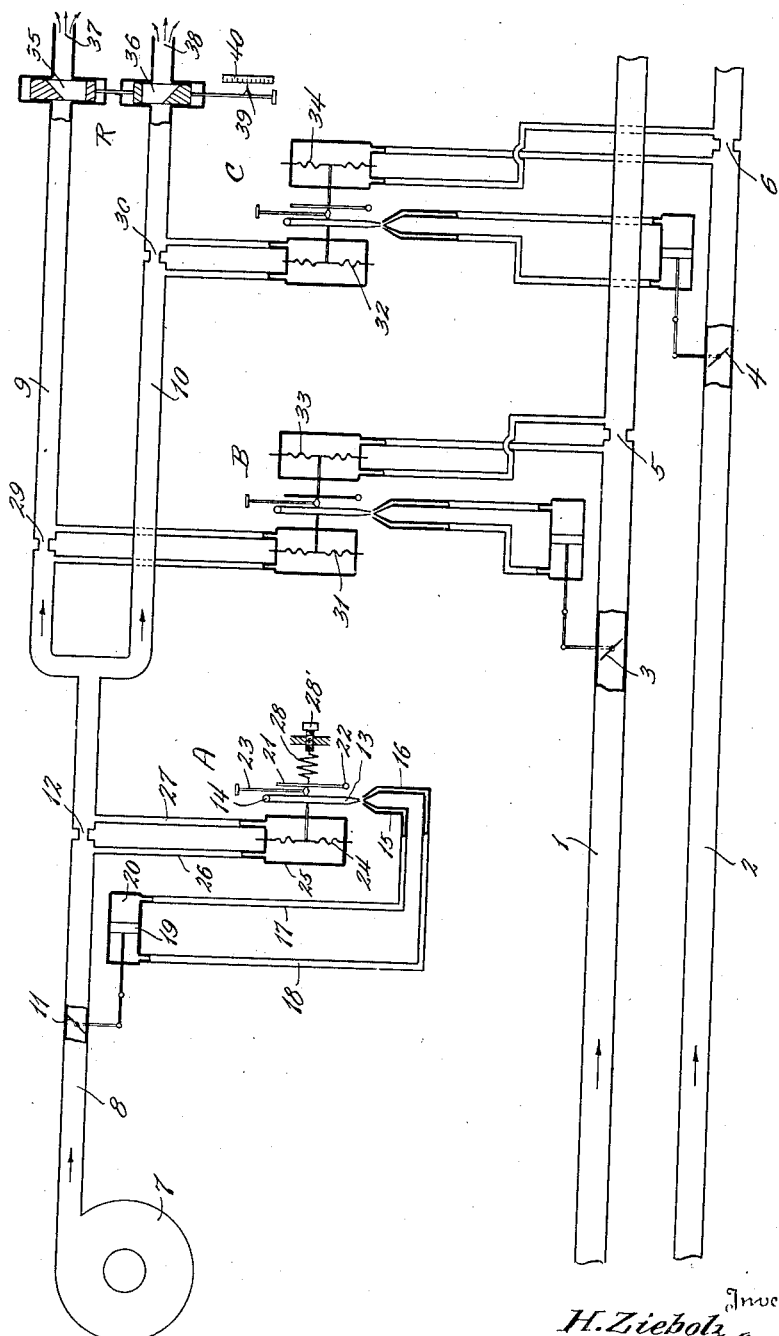
Figure 2:
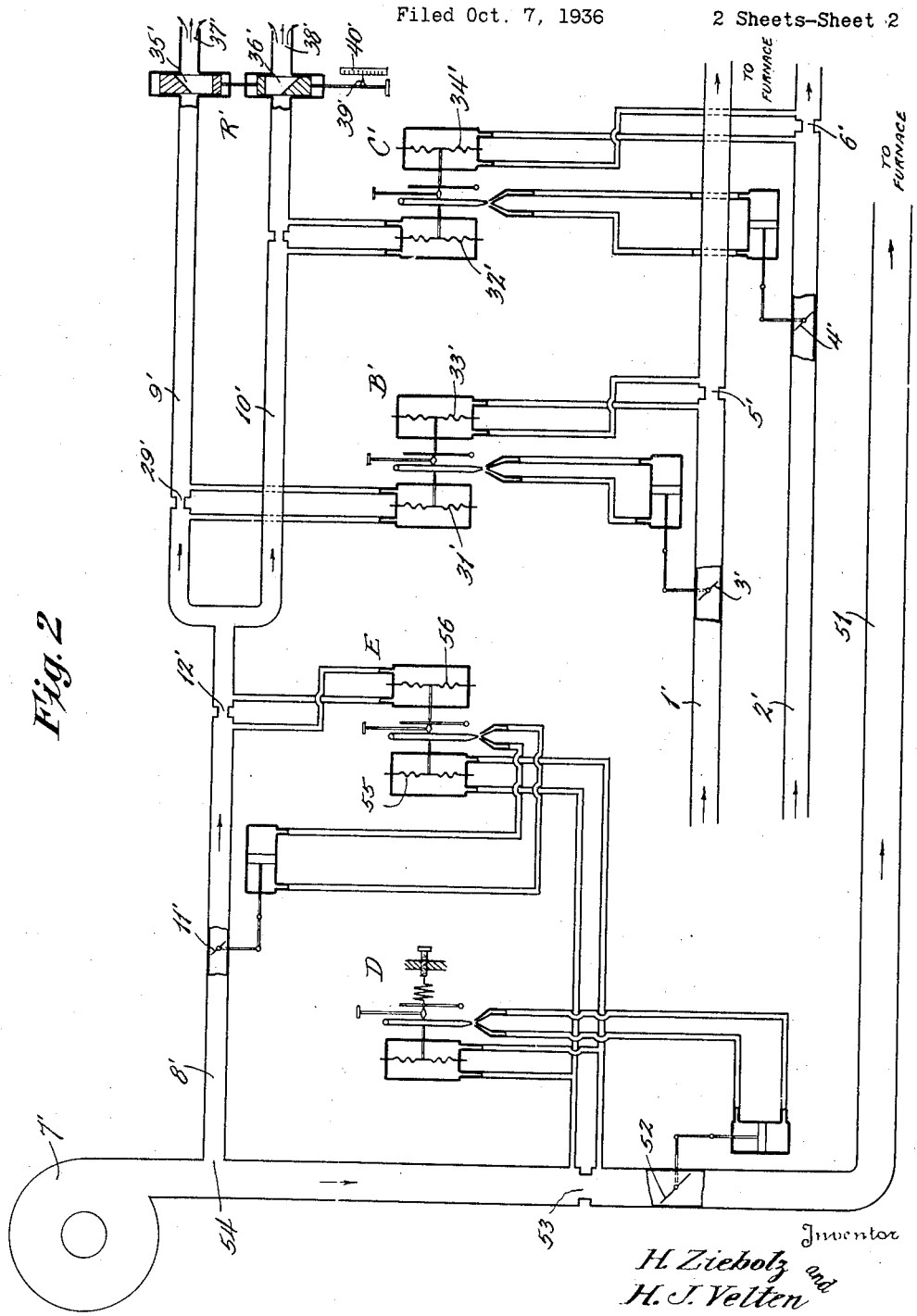

The invention aims to provide a simple, reliable and accurate method and apparatus especially for use in gas plants, industrial furnaces, heating plants and the like, where the atmospheric air contains dust and other impurities which impair the operation of ordinary regulating mechanisms. Other aims and advantages of this invention will appear in the following description, considered in connection with the accompanying drawings herein:

Figure 1 is a diagrammatic illustration of one form of apparatus for practicing the invention; and Figure 2 shows another form of control apparatus, more particularly, for controlling the combustion in a furnace or the like.

Referring to the novel method of proportioning the relative flow and maintaining constant the sum of the flows of pressure fluids which are of different character and subject to variations in pressure, it is proposed, according to this invention, to provide a plurality of pilot fluid flows, one for each pressure fluid; to proportion said pilot flows relatively to each other; to maintain the sum of the pilot flows constant; and to proportion the pressure fluid flows to the respective pilot flows.

More particularly, a furnace may be supplied with a substantially constant total amount of heat by simultaneously burning several different kinds of fluid fuels in any desired relative constituency. Use is hereby made of the well known rule that for all commercial gaseous fuels practically the same amount of combustion air is required for producing the same amount of British thermal units (B. t. u.), irrespective of the B. t. u. content of the fuel per quantity unit.

According to the novel method, therefore, a plurality of pilot fluid flows is provided, one for each single fuel. The pilot flows are proportioned relatively to each other in the ratio in which the single fuels are desired to be fed to the furnace. The total amount of the pilot flows is maintained substantially constant at all times and the supply of each single fuel is controlled so that the product of its B. t. u. content times the fuel amount is proportional to the respective pilot flow. The flow of combustion air supplied to the furnace is maintained proportional to the sum of the pilot flows. The novel method permits a variation, at will, of the ratio between the fuel constituents which, for instance, may be natural gas, coke-oven gas, or the like, without changing the heat supply of the furnace.

If liquid and gaseous fuels are simultaneously burned in a furnace the same rule and method which was above applied to gases is applicable and gives in most cases satisfactory results in spite of the fact that liquid fuels do not exactly follow the above rule. Accordingly a certain deviation from the correct heat value may occur but the error is practically negligible for most commercial applications.

The method may be practiced in various ways. The pilot flow through all of the pilot conduits may be derived from a common source, as well as from individual sources for each conduit. The pilot pressure fluid may be the same as one of the pressure fluids to be regulated and varied where the character of the pressure fluid admits of such use. The method applied to a fuel, control or combustion control system, for example, permits the use of air as the pilot fluid. The air may be derived from the same source as that of the combustion air.

In practicing the method, the flow of the pressure fluids or the supply of the fuels is determined by suitable flow or quantity responsive devices, which, in turn, may control regulators, preferably of the well known "Askania" jet-pipe type. These regulators control usual flow or supply regulating devices, for instance valves, for regulating the flow of the respective fluids.

The illustrated examples of apparatus for practicing the method are more particularly designed for regulating the supply of fluids. Gases or other pressure fluids are delivered to a furnace or mixing chamber (not shown) through main conduits 1 and 2 in the direction indicated by the arrows. The conduits are equipped with a device for varying the flow therethrough, shown as being in the form of valves 3 and 4, connected to be operated by regulators B and C, hereinafter to be described. The conduits are further equipped with devices responsive to the flow, shown as being constrictions 5 and 6 across which a differential pressure will be set up by the flowing fluid.

A source of pilot fluid, shown as being a blower or fan 7, supplies a conduit 8 with pressure fluid. To the conduit 8 are connected branch or pilot conduits 9 and 10, by means of an ordinary manifold. The pilot fluid supplied to the branch or pilot conduits 9 and 10 is maintained at substantially constant pressure by means of a pressure control mechanism comprising a flow regulating device, shown as being a valve 11; a flow responsive device, shown as being a constriction 12; and a regulator A, shown as being of the "Askania" jet-pipe type, and described in the prior patent to Wunsch No. 1,558,529, dated October 27, 1925.

As the same type of regulator is repeatedly used in this apparatus, it will be sufficient to describe the details of the regulator A. It is shown as comprising a jet-pipe 13, pivotally supported at 14 and supplied with pressure fluid from a source (not shown). The pressure fluid issues from the jet-pipe and enters one or the other of a pair of orifices 15 and 16, depending upon the relative position of the jet-pipe and the orifices. The pressure set up in the orifices 15 and 16 is transmitted through pipes 17 and 18 to act on opposite sides of a piston 19 in a cylinder 20. There is further provided a ratio lever 21, pivoted at 22, and a ratio slider 23 to permit variation of the leverage through which the controlling and restoring forces act on the jet-pipe. The regulator is controlled by a diaphragm 24 enclosed in a casing 25. The differential pressure across the constriction 12 is transmitted to the diaphragm through pipes 26 and 27 and tends to displace the jet-pipe counterclockwise against the action of a spring 28 which tends to restore the jet-pipe to its neutral position. The tension of the spring is adjustable by means of a screw 28.

If the pressure delivered by the fan 7 rises, the differential pressure across the constriction 12 will become greater and the jet-pipe further displaced in a counterclockwise direction. The resulting rise of pressure in the pipe 17 will force the piston 19 to move to the right and cause the valve connected thereto to close, thereby diminishing the flow through the constriction 12 until equilibrium is restored between the differential pressure across the same and the spring 28 set for a predetermined pressure. It is easily seen that the pressure regulating mechanism will maintain a constant pressure at the entrance of the manifold.

The branch conduits 9 and 10 are provided with flow responsive devices, also shown as being constrictions 29 and 30. The differential pressure across the constrictions 29 and 30 acts to control the regulators B and C, respectively, by diaphragms 31 and 32. The regulators, in turn are connected to operate valves 3 and 4 in the main conduits. The jet-pipes are restored by a second differential pressure acting on diaphragms 33 and 34, respectively, operated by the differential pressures across the constrictions 5 and 6 in the conduits 1 and 2. It is easily seen that the regulators B and C will act to maintain the flow through the main conduits 1 and 2 proportional to the flows through the pilot conduits 9 and 10, as the differential pressures controlling and restoring the said respective jet-pipes have to be proportional to maintain the regulators in their neutral positions. The ratio between the pilot and main flows may be varied by means of the respective ratio sliders, whereby the action of the controlling and restoring diaphragms is varied relatively to each other.

The ratio of the flows through the pilot conduits may be varied at will by means of an additional ratio setting device R, shown as being in the form of two interconnected gate valves 35 and 36, controlling the discharge of pilot fluid at 37 and 38. The gate valves are so constructed and interconnected as to permit an opposite variation of the openings, while maintaining the sum of the openings constant. In other words, upon resetting of the ratio device, one gate valve will open and the other will close by equal amounts, thereby relatively changing the flow through the individual pilot conduits 9 and 10 without changing the total pilot flows. The setting of the ratio device may be read by means of a pointer 39 and scale 40. A variation of the setting of the ratio device R will result in a corresponding change of flow through the pilot conduits or, more specifically, in a change of the differential pressures at the constrictions 29 and 30 and a corresponding change in the flow through the main conduits 1 and 2.

The control apparatus is more particularly designed for controlling the combustion in a furnace but may also be employed for mixing liquids, air or other fluids of different character, for instance, in air conditioning systems.

The apparatus is shown in Figure 2 as applied to a combustion control. Combustible pressure fluids are carried by the main conduits 1' and 2', the flow through which is controlled in the above described manner by regulators B' and C' in connection with the ratio setting device R'. The fan or blower 7' supplies a main air conduit 51 with combustion air. The amount of combustion air is controlled and maintained constant by a spring loaded regulator D operating a valve 52. The regulator D thereby acts to maintain the differential pressure across a constriction 53 in the conduit 51, constant. The constant differential pressure is used to control the flow of pilot air through the conduit 8' by means of a regulator E operating the valve 11'. The pilot air is suitably branched off from the main air conduit 51 at 54, but it is understood that a separate source or sources of pilot pressure fluid may be employed. The controlling diaphragm 55 restores the regulators; while the restoring differential pressure taken at the constriction 12' acts on a diaphragm 56.

The operation of the control apparatus is briefly as follows: The regulator D will maintain the amount of combustion air constant. The ratio sliders of the regulators B' and C' are set so that the product of the B. t. u. content of each fuel times the amount of said fuel is proportional to the respective pilot flow. Assuming that conduit 1' carries a gas of a B. t. u. content of 1,000 and conduit 2' a gas of 500 B. t. u., the regulator B' will permit half as much gas per unit of pilot flow to pass through conduit 1' as the regulator C' permits to flow through conduit 2'. The total amount of heat is maintained constant by maintaining the sum of the pilot flows through the conduits 9' and 10' constant. The ratio between the fuels carried by the conduits 1' and 2' may, however, be varied at will by means of the ratio device R which changes the ratio of the controlling pilot flows.

The cross section of the pilot conduits and of the constrictions therein can easily be made large enough and correspondingly the amount of pilot fluid increased, to prevent impurities of the air, or other pilot fluid, from impairing the proper working of the apparatus by clogging the constrictions.

The present invention is not restricted to the particular apparatus shown and described for practicing the method. Moreover, it is not indispensable that all the features of the apparatus be used conjointly, since they may be employed advantageously in various combinations and sub-combinations. Furthermore, the method is capable of many variations without departing from the spirit of the invention as set forth in the appended claims.

What is claimed is:

1. Apparatus for proportioning the relative flow and maintaining constant the sum of the flows of pressure fluids which are of different character and subject to variations in pressure, comprising, in combination, a main conduit for each of said pressure fluids; means for varying the flow through said main conduits; a source delivering pilot fluid at constant pressure; a discharge manifold connected to said source of pilot fluid having the same number of branches as there are main conduits; means for varying the discharge through said branches by oppositely and simultaneously restricting and opening the same in mutual dependence, while maintaining the total opening constant; and means responsive to the flow through each pilot conduit and connected to control the respective flow varying means in said main conduits.

2. Apparatus for proportioning the relative flow and maintaining constant the sum of the flows of pressure fluids which are of different character and subject to variations in pressure, comprising, in combination, a main conduit for each of said pressure fluids; a valve in each of said main conduits; a pilot conduit for each of said pressure fluids; a source of pilot fluid at substantially constant pressure connected to feed said pilot conduits; a gate valve in each of said pilot conduits; means for oppositely and simultaneously varying the opening of said gate valves while maintaining the sum of the openings of all valves constant; means responsive to the flow through said pilot conduits; and jet-pipe regulators connected to be controlled by said flow responsive means and connected to operate the respective valves in the main conduits.

3. Apparatus for supplying a furnace with a constant total amount of fuel consisting of a plurality of single fuels of different character, comprising, in combination, means for conveying each of said fuels to said furnace; means for varying the amount of each fuel conveyed to said furnace; a pilot conduit for each fuel; means to supply said pilot conduits with pilot fluid at constant pressure; means for and simultaneously varying the flow through said pilot conduits relatively to each other without varying the total flow; and means responsive to the flow through said pilot conduits and connected to control the respective means for varying the amount of fuel.

4. Apparatus for controlling the supply of a furnace with fuel to produce a substantially constant amount of heat by feeding a plurality of different combustible pressure fluids in a predetermined relative constituency to the furnace, comprising, in combination, a conduit for the combustion air; a valve in said conduit; means responsive to the flow through said air conduit; a regulator connected to be controlled by said flow responsive means and arranged to maintain a constant air flow by operating said valve; a main conduit for each of said pressure fluids; means for varying the flow through said main conduits; a pilot conduit for each pressure fluid; a source for supplying said pilot conduit with fluid, including means for varying the flow of pilot fluid in response to the flow of combustion air; means for varying the flow through said pilot conduits relatively to each other without changing the sum of the flows; and means responsive to the flow through each pilot conduit and connected to control the respective flow varying means in said main conduits to maintain the product of the B. t. u. content times the fuel amount proportional to the respective pilot flow.

5. Apparatus for controlling the supply of a furnace with fuel to produce a substantially constant amount of heat by feeding a plurality of different combustible pressure fluids in a predetermined relative constituency to the furnace, comprising, in combination, a conduit for the combustion air; a valve in said conduit; means responsive to the flow through said air conduit; a jet-pipe regulator connected to be controlled by said flow responsive means and arranged to maintain a constant air flow by operating said valve; a main conduit for each of said pressure fluids; means for varying the flow through said main conduits including jet-pipe regulators; a pilot conduit for each pressure fluid; a source for supplying said pilot conduit with fluid including means for varying the flow of pilot fluid in response to the flow of combustion air, said last named means including a jet-pipe regulator; means for varying the flow through said pilot conduits relatively to each other without changing the sum of the flows; and means responsive to the flow through each pilot conduit and connected to control the respective jet-pipe regulators for varying the flow through said main conduits to maintain the product of the B. t. u. content times the fuel amount proportional to the respective pilot flows.

6. Apparatus for supplying a furnace with a constant total amount of fuel consisting of a plurality of single fuels of different character, comprising, in combination, means for conveying each of said fuels to said furnace; means for varying the amount of each fuel conveyed to said furnace; a pilot conduit for each fuel; means to supply said pilot conduits with a constant total amount of pilot fluid; means for varying the flow through each individual pilot conduit and simultaneously changing the ratio of the supply of the fuels; a conduit for combustion air; and means directly responsive to the sum of all pilot flows for controlling the flow of air through said air conduit.

7. Apparatus for supplying a furnace with a constant total amount of fuel consisting of a plurality of single fuels of different character, comprising, in combination, means for conveying each of said fuels to said furnace; means for varying the amount of each fuel conveyed to said furnace; a pilot conduit for each fuel; means to supply said pilot conduits with pilot fluid; means for controlling the relative flow through said pilot conduits by automatically increasing the flow through one conduit upon decreasing the flow through another conduit without varying the sum of the flows; a conduit of combustion air; and means responsive to the sum of all pilot flows for controlling the flow of air through said air conduit.

8. That method of proportioning the relative flow and maintaining constant the sum of the flows of pressure fluids which are of different character and subject to variations in flow, which consists in providing a pilot fluid flow; maintaining said pilot flow constant; discharging said pilot flow through branches, one for each pressure fluid; controlling the discharge through said branches in a predetermined ratio by simultaneously increasing the discharge from one branch upon a corresponding decrease in another thereby; maintaining the total discharge constant; and proportioning the pressure fluid flows to the respective branch flows.

9. That method of supplying a furnace with fuel to produce a substantially constant amount of heat which consists in feeding a plurality of fuels of different character to the furnace; providing a plurality of pilot fluid flows, one for each fuel, controlling said pilot flows relatively to each other in the ratio in which the single fuels are desired to be fed to the furnace by simultaneously increasing at least one pilot flow upon decreasing another pilot flow; maintaining the sum of the pilot flows constant; controlling the supply of each single fuel so that the product of its B. t. u. content times the fuel amount is proportional to the respective pilot flow; and supplying the furnace with an amount of combustion air which is proportional to the total pilot flow.

10. Apparatus for proportioning the relative flow and maintaining constant the sum of the flows of pressure fluids which are of different character and subject to variations in pressure, comprising, in combination, a main conduit for each of said pressure fluids; means for varying the flow through said main conduits; a pilot conduit for each pressure fluid; means to supply said pilot conduits with pilot fluid at constant pressure; means for varying the flow through said pilot conduits relative to each other by simultaneously increasing the flow through one conduit upon a decrease in another without varying the sums of the flows; and means responsive to the flow through each pilot conduit and connected to control the respective flow varying means in said main conduits.

HERBERT ZIEBOLZ.
HUBERT J. VELTEN.